(12) United States Patent
Beville et al.

(10) Patent No.: US 7,082,689 B2
(45) Date of Patent: Aug. 1, 2006

(54) KEYLESS SHOE LOCK FOR RECIPROCATING SAW

(75) Inventors: John M. Beville, Jackson, TN (US); John W. Schnell, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 209 days.

(21) Appl. No.: 10/685,351

(22) Filed: Oct. 14, 2003

(65) Prior Publication Data

US 2006/0101650 A1 May 18, 2006

Related U.S. Application Data

(60) Provisional application No. 60/453,815, filed on Mar. 11, 2003, provisional application No. 60/417,946, filed on Oct. 11, 2002.

(51) Int. Cl.
*B27B 9/02* (2006.01)
*B27B 21/08* (2006.01)

(52) U.S. Cl. ............. 30/377; 30/392; 403/323
(58) Field of Classification Search .......... 30/377, 30/392, 340, 376; 16/405; 248/132, 149, 248/157; 403/323
See application file for complete search history.

(56) References Cited

U.S. PATENT DOCUMENTS

| 3,496,972 | A | * | 2/1970 | Rees | 30/377 |
| 5,007,172 | A | * | 4/1991 | Palm | 30/377 |
| 5,421,091 | A | * | 6/1995 | Gerritsen, Jr. | 30/377 |
| 6,272,757 | B1 | * | 8/2001 | Roe | 30/377 |
| 6,317,988 | B1 | * | 11/2001 | Tachibana et al. | 30/392 |
| 6,473,975 | B1 | * | 11/2002 | Sellmann | 30/386 |
| 6,815,193 | B1 | * | 11/2004 | Poulose et al. | 435/220 |
| 6,851,193 | B1 | * | 2/2005 | Bednar et al. | 30/377 |
| 2004/0187321 | A1 | * | 9/2004 | Hartmann et al. | 30/377 |
| 2005/0183271 | A1 | * | 8/2005 | Sugiura et al. | 30/392 |

OTHER PUBLICATIONS

Milwaukee Operator's Manual,, Heavy Duty Orbital Super Sawzall® 6521 Series, 28 pages.
Milwaukee Service Parts List, Bulletin No. 54-40-5025, 120 V Orbital Super Sawzall®, Catalog No. 6521-50, 2 pages.
http://www.amazon.com/exec/obidos/tg/detail/-/B00005A8SC/102, Amazon.com: Tools & Hardware: Milwaukee 6521-50 Limited Edition 50th anniversary Heavy Duty 11 Amp Super Sawzall® with Orbital Action, Mar. 12, 2004, 3:38 PM, 5 pages.

* cited by examiner

*Primary Examiner*—Timothy V. Eley
*Assistant Examiner*—Jason Prone
(74) *Attorney, Agent, or Firm*—Mehul R. Jani; Adan Ayala

(57) ABSTRACT

The present invention is directed to a keyless shoe lock assembly for a reciprocating saw. The keyless shoe lock assembly is capable of engaging and releasing a shoe bracket for the positional adjustment of a shoe relative to a blade clamp of the reciprocating saw. The keyless shoe lock assembly includes a shoe bracket for positional adjustment relative to a lock plate, a pin for alternately engaging and releasing the shoe bracket, and a lever connected to the pin for the rotation thereof. The keyless shoe lock assembly may be used to alternately engage and release a shoe bracket without additional hardware.

8 Claims, 6 Drawing Sheets

KEYLESS SHOE LOCK FOR RECIPROCATING SAW

CROSS REFERENCE TO RELATED APPLICATIONS

The present application claims the benefit under 35 U.S.C. § 119(e) of U.S. Provisional Patent Applications Ser. No. 60/417,946 filed on Oct. 11, 2002 and Ser. No. 60/453,815 filed on Mar. 11, 2003, which are herein rated by reference in their entirety.

FIELD OF THE INVENTION

The present invention relates generally to the field of reciprocating saws, and particularly to a keyless shoe assembly for reciprocating saws wherein the keyless shoe assembly employs a keyless lock allowing positional adjustments to be made to the shoe assembly without the need for hand tools.

BACKGROUND OF THE INVENTION

Reciprocating saws are well known in the art. The straight back and forth, or reciprocal, action of its blade, characterizes a reciprocating saw. Some reciprocating saw also have the ability to assume an orbital blade motion, characterized by a slightly circular motion as the blade moves back and forth. Reciprocating saws include a blade clamp suitable for securing the blade to the saw, and a brace, commonly referred to as a shoe, used to brace the reciprocating saw against a work piece during a cut. The shoe is generally located some adjustable distance from the blade clamp. The adjustable nature of the shoe serves two purposes: it allows a user to control the depth of a cut, and it makes it possible to evenly distribute wear on the blade. FIG. 1 illustrates a typical reciprocating saw 50, including a saw blade 54 and a shoe 56 connected to a saw 52.

While using the reciprocating saw, it is frequently desirable to adjust the distance of the shoe from the blade clamp. For instance, a user might switch from making a cut in a hard to reach place, requiring a longer length of blade, to making a plunge cut into a material at a shallow depth, requiring a much shorter blade length. In addition, frequently adjusting the distance of the shoe from the blade clamp has the benefit of shifting the range of contact of the teeth as the blade reciprocates; thereby lengthening the life of a typical reciprocating saw blade.

Adjustment of the distance from the shoe to the blade clamp may be accomplished through the positional adjustment of a shoe bracket, to which the shoe is attached, and which is capable of movement parallel to the blade of the saw. In many typical applications, a hand tool such as a wrench, screwdriver, or other suitable device may be used to alternately tighten and loosen a fastener securing the shoe bracket, allowing adjustment of its position, and consequently the position of the shoe. However, the conventional use of a wrench, screwdriver, or some other hand tool to adjust the position of the shoe bracket may not be desirable. In addition to the added time expended in locating the hand tool, if the adjustment must be made at a remote location, the absence of such a tool may effectively prevent adjustment of the shoe bracket. While it is possible to add an integrated wrench assembly to a reciprocating saw for tightening and loosening the fastener securing the shoe bracket, the wrenching action required does not correspond to the normal gripping action of a typical user.

In the prior art, this limitation has typically been overcome by providing a keyless shoe lock, consisting essentially of a shoe bracket including a plurality of notches or grooves, and a pin suitable for engaging the shoe bracket when seated in a notch or groove. The pin is generally attached to a lever, the action of which corresponds with the normal gripping action of a typical user. But this method also presents limitations. First of all, the pin must be of a certain diameter to meet the necessary strength requirements for a tool that vibrates as rapidly and as strongly as a reciprocating saw does—especially when cutting through particularly unwieldy material. Second, the notches or grooves in the shoe bracket must be a certain minimum distance apart to provide enough material contact with the pin to ensure the shoe bracket does not slip during operation.

Thus, the combination of two factors, namely the diameter of the pin and the spacing of the notches or grooves in the shoe bracket, severely limits the number of discrete positions the shoe bracket and shoe are capable of assuming. As previously noted, one of the reasons that it is desirable to adjust the shoe bracket and shoe is that shifting the range of contact of the blade lengthens the life of a saw blade. As the teeth may be much smaller than the distance between discrete positions attainable by the shoe as taught by the prior art, the use of a pin and a shoe bracket including notches or grooves may have served only to shift the range of contact between sets of teeth on the reciprocating saw blade.

Consequently, it would be desirable to provide a keyless shoe lock for a reciprocating saw, enabling the positional adjustment of a shoe in small increments.

SUMMARY OF THE INVENTION

Accordingly, the present invention is directed to a keyless shoe lock assembly for reciprocating saw, capable of engaging and releasing a shoe bracket, for the positional adjustment of a shoe relative to a blade clamp of the reciprocating saw. The keyless shoe lock assembly may include a shoe bracket capable of positional adjustment relative to a lock plate, a pin suitable for alternately engaging the shoe bracket against and releasing it from the lock plate, and a lever connected to the pin suitable for the rotation thereof. In exemplary embodiments of the present invention, a keyless shoe lock may be used to alternately engage and release a shoe bracket by a person of normal physical strength without the use of additional hardware.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
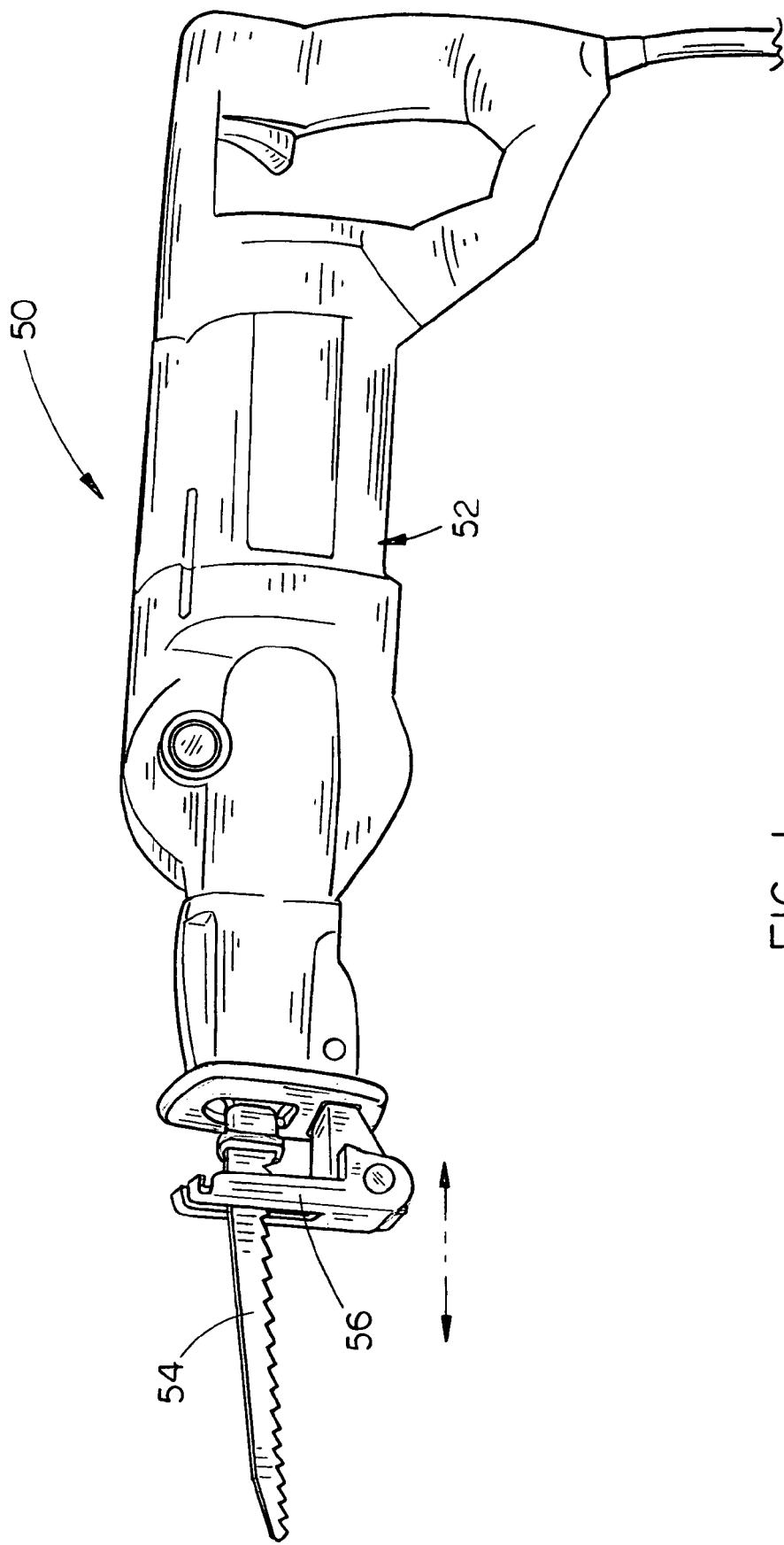
FIG. 1 is an isometric view illustrating an exemplary reciprocating saw.

Reference will now be made in detail to the presently preferred embodiments of the invention, examples of which are illustrated in the accompanying drawings.

Referring generally now to FIGS. 2 through 9, a reciprocating saw having a keyless shoe assembly in accordance with an exemplary embodiment of the present invention is described. The keyless shoe assembly includes a keyless lock that allows a user of a reciprocating saw to make positional adjustments to the shoe without the need for hand tools. Shoe adjustability allows for longer life of a reciprocating saw blade due to a shift in the range of contact of the teeth as the blade reciprocates. Preferably, the shoe bracket (that part to which the shoe is attached which is clamped to the tool) is attached as solidly as possible to the reciprocating saw in order to eliminate the amount of "play" in the shoe as the user cuts with the saw.

As shown in FIGS. 2 through 9, a keyless shoe lock assembly 100 for a reciprocating saw in accordance with an exemplary embodiment of the present invention includes a shoe 102 pivotally connected to a shoe bracket 104 with a fastener 106. Fastener 106 may comprise a pin, a rivet, and the like as contemplated by one of ordinary skill in the art. The shoe bracket 104 is enmeshed with a lock plate 108 by a pin 110. The pin 110 may have a variety of shapes and profiles suitable for engaging the shoe bracket 104, including but not limited to an eccentric shape, a cam shape, and a circular shape including a substantially flat portion. The lock plate 108 and pin 110 are connected to a housing of the reciprocating saw 120, the pin 110 being rotationally connected to the housing of the reciprocating saw 120. In an exemplary embodiment of the present invention, the pin 110 is fixedly connected to a lever 112, which pivots about an axis of the pin 110. It should be appreciated that the interface between the shoe 102, the shoe bracket 104, and fastener 106, may include a spring or some other suitable means for stabilizing the shoe 102 relative to the shoe bracket 104. Also, it should be appreciated that the shoe 102 and fastener 106, or the shoe bracket 104 and fastener 106, or the lock plate 108 and the housing of the reciprocating saw 120, or the pin 110 and the lever 112, may be of one-piece construction without departing from the scope and spirit of the present invention.

In the embodiment shown, the pin 110 allows the shoe bracket 104 to slide in from the front of the tool when in the "unlocked" position. When rotated approximately 90 degrees, the pin 110 pushes the shoe bracket 104 down against the lock plate 108. Both the lock plate 108 and the shoe bracket 104 comprise "teeth" which mesh when the shoe bracket 104 and the lock plate 108 are pressed against each other. These teeth hold the shoe bracket 104 in position while the reciprocating saw is in use. It should be appreciated that while the teeth of the embodiment shown comprise a plurality of semi-circular ridges; one of ordinary skill in the art may also contemplate a plurality of semi-circular ridges and correspondingly shaped grooves, a plurality of interference protrusions, a friction interface, and the like, for securing the shoe bracket against the lock plate without departing from the scope and spirit of the present invention.

Figure 2:
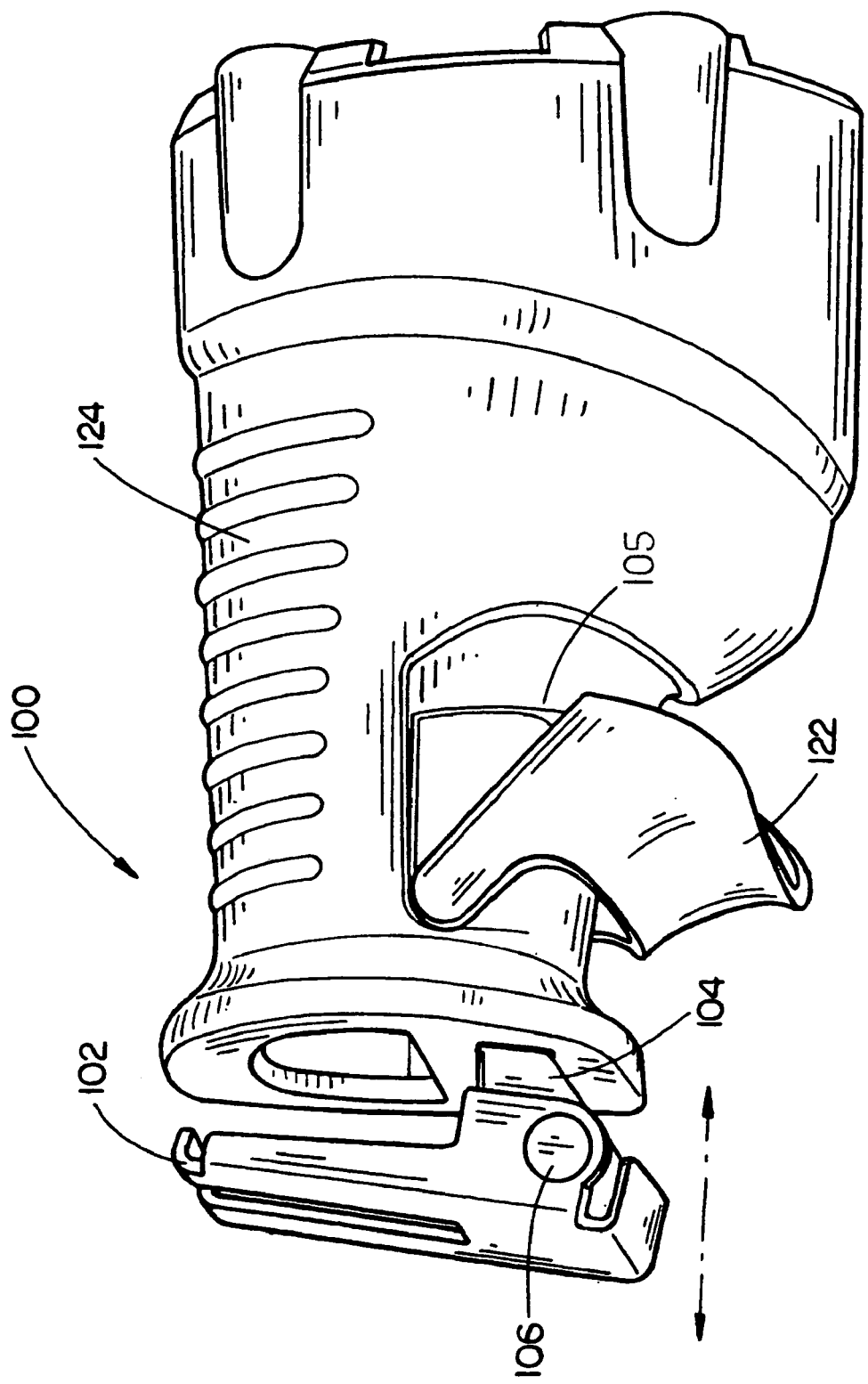
FIG. 2 is an isometric view illustrating a keyless shoe lock assembly for a reciprocating saw, capable of alternately engaging and releasing a shoe bracket in accordance with an exemplary embodiment of the present invention.

Referring generally to FIG. 2, in a further exemplary embodiment of the present invention, the lever 112 may be covered by a molded or co-molded plastic part 122 for purposes including comfort, locking, and UL listing. In another exemplary embodiment of the present invention, the lever including the molded or co-molded plastic part 122 may automatically lock against a boot covering a casting 124 when a user grasps the boot covering the casting 124 and the lever 112 in the course of normal gripping action. This locking action may be accomplished through the use of a locking device 105 such as an interference protrusion engaged when the pin 110 is in the locked position and engages the shoe bracket 104, a plurality of teeth, a plurality of teeth and grooves, a friction interface, and the like.

Figure 3:
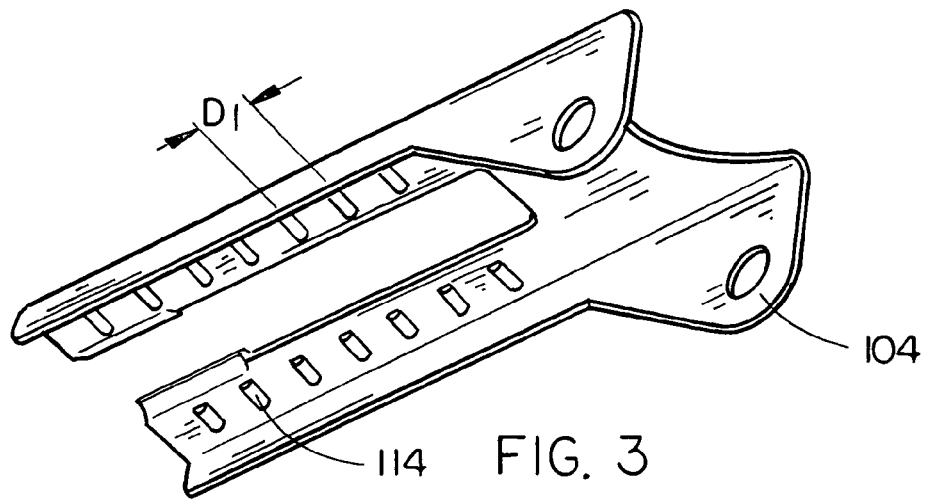
FIG. 3 is an isometric view illustrating a shoe bracket for a keyless shoe lock assembly in accordance with an exemplary embodiment of the present invention.
Figure 4:
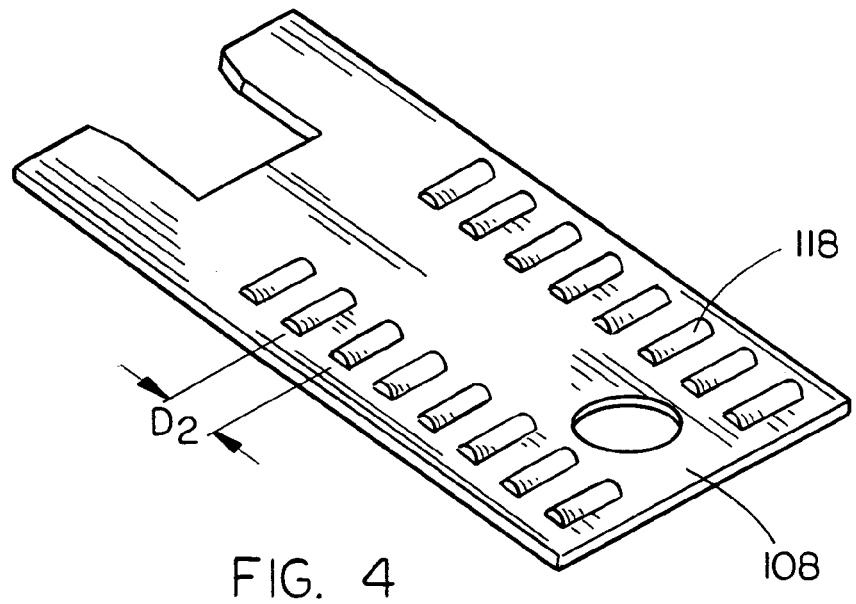
FIG. 4 is an isometric view illustrating a lock plate for a keyless shoe lock assembly in accordance with an exemplary embodiment of the present invention.

Referring generally to FIGS. 3 and 4, a shoe bracket 104 and a lock plate 108 include series of teeth 114 and 118 respectively. Teeth 114 and 118 may be spaced apart as needed to provide sufficient range and an adequate number of discrete steps for the shoe bracket 104 to assume, as dictated by the size of the reciprocal saw and its possible or intended applications. Preferably, the teeth 114 of the shoe bracket 104 are positioned on either side of the slot, on the underside of the shoe bracket 104 and are spaced from each other so as to allow debris to fall from between them. As noted, the lock plate 108, like the shoe bracket 104, also comprises teeth 118. However, in the exemplary embodiment shown, the spacing $D_2$ between the teeth 118 is half of the spacing $D_1$ on the shoe bracket 104 allowing the user to lock the two pieces securely together regardless of their relative position. It has been determined that if the shoe bracket 104 and lock plate 108 are provided with the same tooth spacing $D_1$ and $D_2$, one part is allowed to move relative to the other (a total distance of the space between each tooth). However, by doubling the spacing on one part from what is on the other, this problem is reduced or eliminated, while still allowing the user to lock in all positions, and still eliminating structure that would create a debris trap.

Figure 5:
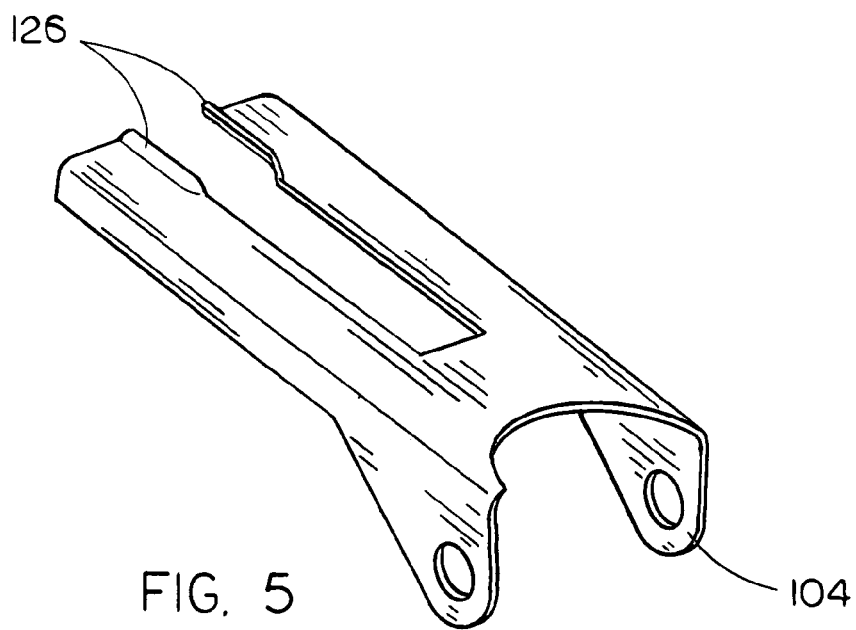
FIG. 5 is an obverse isometric view illustrating the shoe bracket shown in FIG. 3.

Referring generally to FIG. 5, the "anti-lock protrusion" features 126 on the ends of the legs of the shoe bracket 104 prevent the user from turning the pin 110 while the shoe bracket 104 is in a position where it is undesirable to lock.

Figure 6:
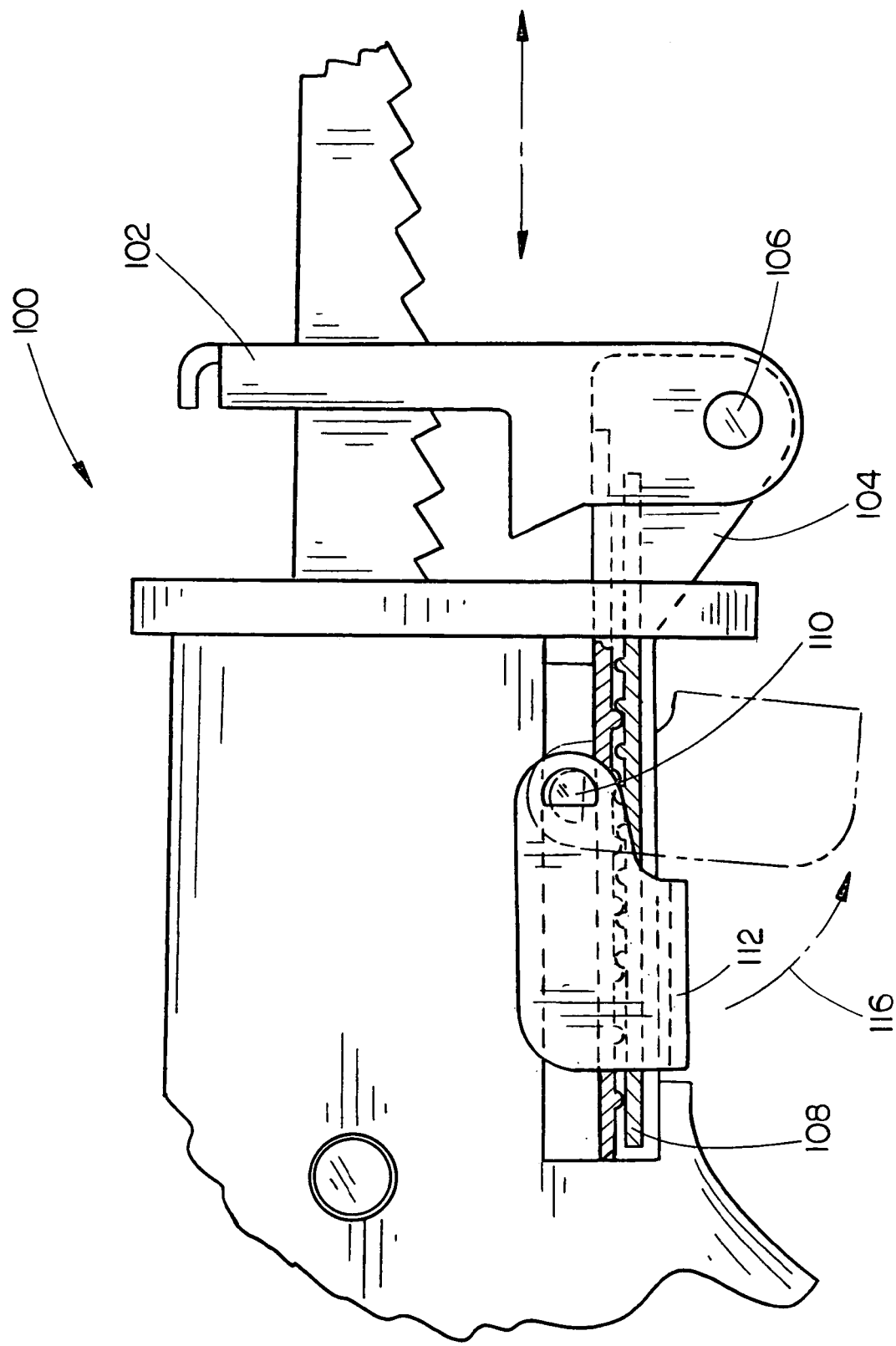
FIG. 6 is a partial cross-sectional side elevational view of the keyless shoe lock assembly shown in FIG. 2, illustrating a lever action for disengaging the shoe bracket from a lock plate in accordance with an exemplary embodiment of the present invention.
Figure 7:
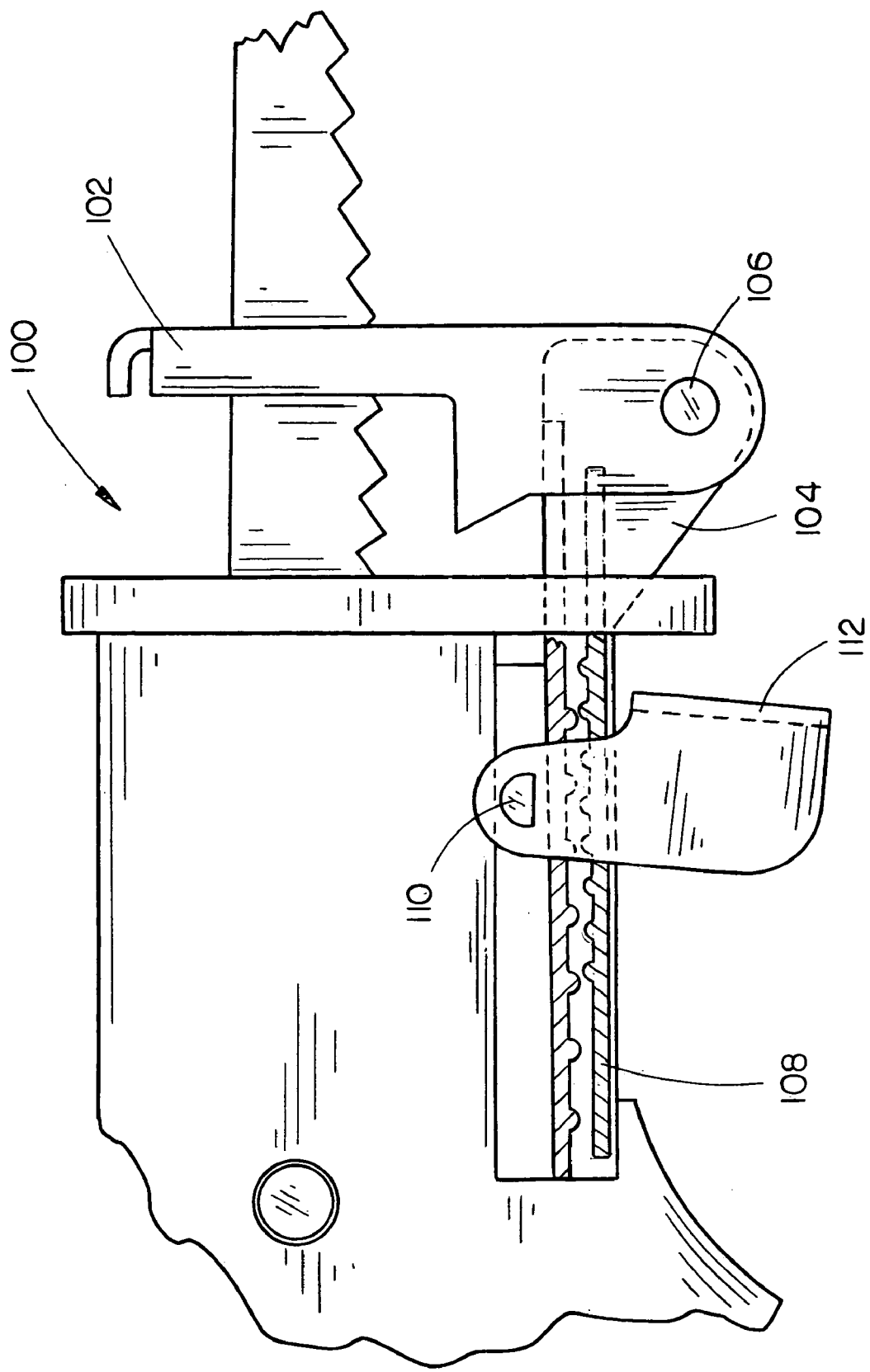
FIG. 7 is a partial cross-sectional side elevational view of the keyless shoe lock assembly shown in FIG. 2, wherein the shoe bracket has been disengaged from the lock plate by the lever action shown in FIG. 6.
Figure 9:
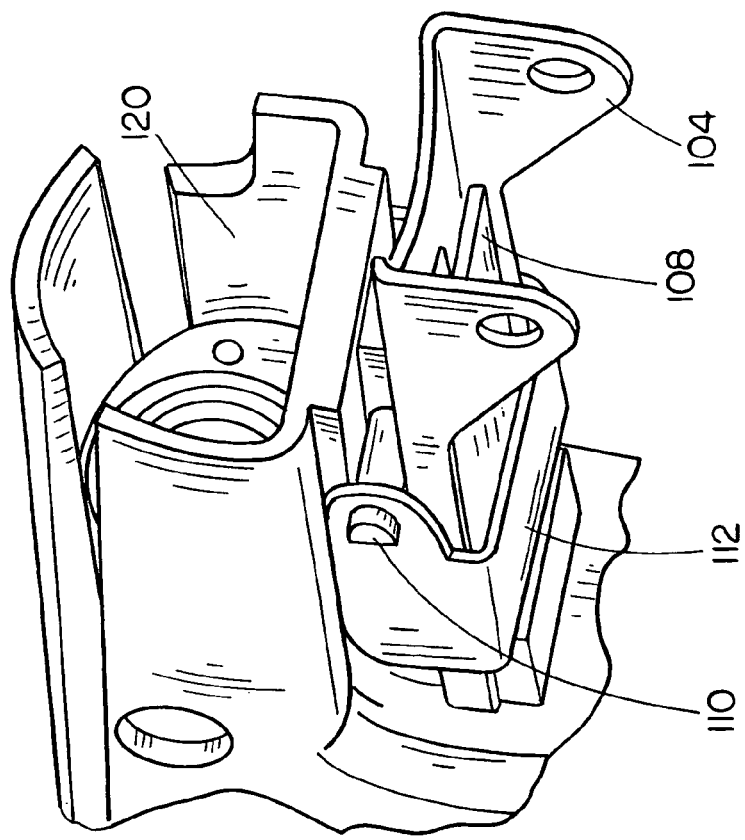
FIG. 9 is a partial isometric view of the keyless shoe lock assembly shown in FIG. 2, wherein the shoe bracket is engaged against the lock plate.
Figure 8:
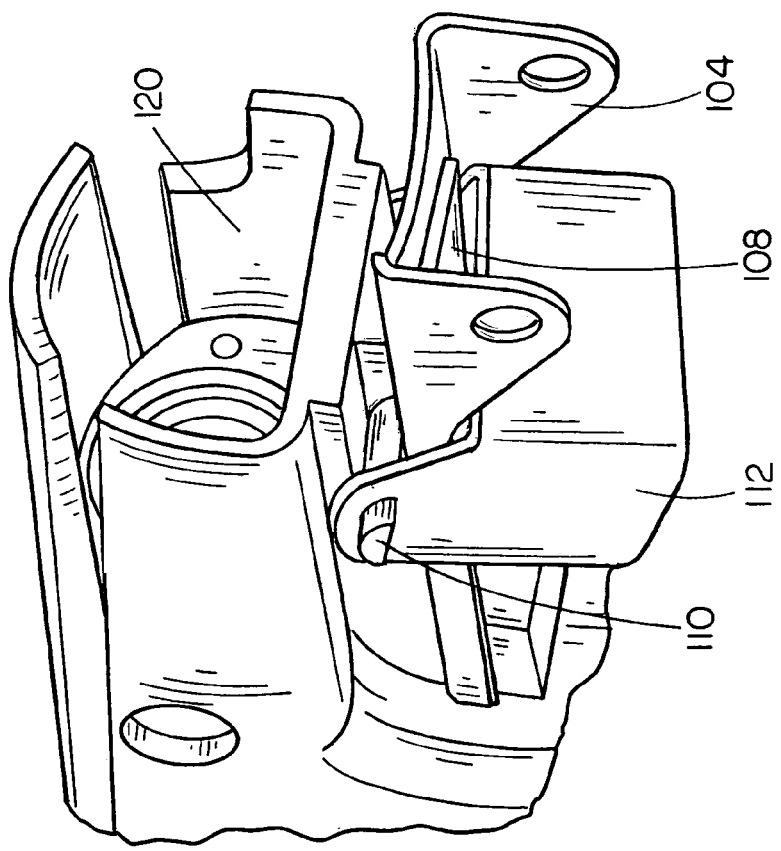
FIG. 8 is a partial isometric view of the keyless shoe lock assembly shown in FIG. 2, wherein the shoe bracket is disengaged from the lock plate.

Referring generally to FIGS. 6 through 9, a meshing of teeth 114 and 118 locks the shoe bracket 104 in place relative to the lock plate 108 and the housing of the reciprocating saw 120, as seen in FIG. 6. When the lever 112 is rotated 116 about the axis of the pin 110, in the exemplary embodiment of the present invention shown, the profile of the pin 110 relative to the shoe bracket 104 changes, allowing the shoe bracket 104 to slide relative to a lock plate 108, as seen in FIG. 7. It should be noted that it is the meshing teeth 114 and 118 that actually lock the shoe bracket 104 from moving in and out of position. The pin 110 serves to securely press the shoe bracket 104 downward against the lock plate 108, enabling the meshing of teeth 114 and 118. Thus, the pin 110 prevents movement of the shoe bracket 104 in a direction perpendicular to a plane of the lock plate 108, while the lock plate 108 prevents movement of the shoe bracket 104 in a direction parallel to the plane of the lock plate 108.

It is believed that the keyless shoe lock assembly of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A keyless shoe lock assembly, comprising:
   a shoe for abutting a work piece for at least one of stabilizing a tool, limiting the depth of a cut, and evenly distributing wear on a blade;
   a shoe bracket connected to the shoe, for securing the shoe and having a plurality of teeth;
   a lock plate enmeshed with the shoe bracket, for locking the shoe bracket and having a plurality of teeth for meshing with the plurality of teeth of the shoe bracket; and
   a pin rotationally disposed of the shoe bracket and lock plate, for forcing the shoe bracket against the lock plate;
   wherein rotation of the pin forces the shoe bracket against the lock plate, providing a plurality of discrete locking positions for the shoe bracket through a meshing of the plurality of teeth.

2. The keyless shoe lock assembly of claim 1, wherein at least one of the shoe bracket and the lock plate include anti-lock protrusions for preventing rotation of the pin while the shoe bracket is disposed in a position undesirable for locking.

3. The keyless shoe lock assembly of claim 1, wherein the shoe bracket and the lock plate including the plurality of teeth include teeth for providing a plurality of discrete locking positions for the shoe bracket.

4. The keyless shoe lock assembly of claim 3, wherein the shoe bracket including the plurality of teeth includes teeth spaced substantially twice as far apart as the plurality of teeth of the lock plate.

5. The keyless shoe lock assembly of claim 3, wherein the lock plate including the plurality of teeth includes teeth spaced substantially twice as far apart as the plurality of teeth of the shoe bracket.

6. The keyless shoe lock assembly of claim 1, further comprising a lever assembly comprising at least one of a lever, a molded part, and a co-molded part, coupled with the pin for providing mechanical advantage for rotating the pin.

7. The keyless shoe lock assembly of claim 6, wherein the lever assembly comprises a locking device for locking the lever assembly against a tool.

8. The keyless shoe lock assembly of claim 7, wherein the locking device comprises at least one of an interference protrusion, a plurality of teeth, a plurality of grooves, or a friction interface for locking the lever assembly against a tool.

\* \* \* \* \*